US006634658B2

United States Patent
Larouche

(10) Patent No.: US 6,634,658 B2
(45) Date of Patent: Oct. 21, 2003

(54) CART MOVING SYSTEM

(76) Inventor: Johnny Larouche, 112 Williams Street, Merlin, Ontario (CA), N0P 1W0

( * ) Notice: Subject to any disclaimer, the term of this patent is extended or adjusted under 35 U.S.C. 154(b) by 46 days.

(21) Appl. No.: 09/981,061

(22) Filed: Oct. 16, 2001

(65) Prior Publication Data

US 2003/0071426 A1 Apr. 17, 2003

(51) Int. Cl.[7] .................................................. B62B 1/00
(52) U.S. Cl. ................ 280/47.2; 280/47.17; 280/47.18; 280/47.27; 414/458
(58) Field of Search ........................... 280/47.2, 47.29, 280/47.27, 47.28, 43.1, 47.18, 47.17, 47.24, 35, 79.11, 30; 414/458, 490, 444, 540

(56) References Cited

U.S. PATENT DOCUMENTS

| | | | | |
|---|---|---|---|---|
| 2,450,690 A | * | 10/1948 | Robins | 414/458 |
| 3,499,658 A | * | 3/1970 | Fernholz et al. | 280/47.2 |
| 3,831,211 A | * | 8/1974 | Bustamante | 114/344 |
| 3,896,904 A | | 7/1975 | Walker | 187/9 R |
| 3,907,138 A | | 9/1975 | Rhodes | 214/370 |
| 4,244,595 A | | 1/1981 | Sagert | 280/47.29 |
| 4,570,953 A | * | 2/1986 | McPeak et al. | 280/5.3 |
| 4,681,330 A | * | 7/1987 | Misawa | 280/47.2 |
| 4,706,983 A | * | 11/1987 | Griswold | 280/414.2 |
| 5,096,265 A | * | 3/1992 | Chang | 301/111.06 |
| 5,195,762 A | * | 3/1993 | Pressly | 280/5.28 |
| 5,251,922 A | * | 10/1993 | Mann | 280/47.29 |
| 5,647,720 A | * | 7/1997 | Golicz et al. | 414/490 |
| 5,716,061 A | * | 2/1998 | Sloan et al. | 280/43.23 |
| 5,738,480 A | * | 4/1998 | Butzen | 414/490 |
| 5,779,250 A | * | 7/1998 | Becht | 280/414.2 |
| 5,810,373 A | * | 9/1998 | Miranda | 280/47.2 |
| 5,829,763 A | * | 11/1998 | Jeavons | 280/5.3 |
| 6,062,802 A | * | 5/2000 | Aenchbacher | 414/490 |
| 6,098,564 A | * | 8/2000 | Zeilinger | 114/263 |
| 6,406,248 B1 | * | 6/2002 | McGill et al. | 414/634 |
| 6,446,987 B2 | * | 9/2002 | Abraham et al. | 280/47.2 |

FOREIGN PATENT DOCUMENTS

GB    2 269 806    2/1994    ............ B66F/9/06

* cited by examiner

Primary Examiner—Brian L. Johnson
Assistant Examiner—Kelly E Campbell
(74) Attorney, Agent, or Firm—Taylor & Aust, P.C.

(57) ABSTRACT

A cart moving system and individual hand carts therefor. First and second hand carts can be lashed together with the item therebetween. Auxiliary wheel assemblies are provided for each hand cart, to facilitate transport across uneven and irregular surfaces by using auxiliary wheels of large diameter. The auxiliary wheel assemblies can be installed or removed from the cart while a load is supported on the cart.

14 Claims, 3 Drawing Sheets

CART MOVING SYSTEM

BACKGROUND OF THE INVENTION

1. Field of the Invention

The present invention relates generally to hand carts for moving items and goods; and, more particularly, to cart moving systems useful for moving heavy and/or bulky items.

2. Description of the Related Art

Two wheeled hand carts, sometimes referred to as hand trucks, are used commonly to move heavy items from one location to another. In its basic form, a hand cart includes a substantially upright frame having a handle or handles at the top and a pair of spaced wheels at the bottom, usually just at or slightly outside of the frame. A forwardly extending platform is provided, projecting from the bottom of the frame forwardly of the wheels. Items are placed on the platform, or the platform is slid under items to be moved. Tipping the hand cart rearwardly on the wheels elevates the platform and lifts the article or articles supported by the platform. The hand cart supporting the article or articles is rolled on the wheels to the desired location, with the operator having to balance the weight of the item on the hand cart wheels. The basic hand cart works well for moving stacks of relatively small items, such as boxes and other items that can be lifted entirely from one side or edge by placing an edge of the item on the hand cart platform, and tipping the hand cart rearwardly to transfer the weight of the item onto the hand cart wheels.

For larger or heavier items, it may be difficult to lift the item by simply resting an edge of the item on the platform. The item may be unstable, and fall from support by the hand cart. To assist in moving larger items, such as refrigerators and other appliances, it is known to provide a strap on the hand cart to secure the item to the upright frame of the hand cart. The appliance is thereby secured to the hand cart, and supported in a stable manner during transport.

For even larger, bulkier and heavier items, such as safes, freezers, office furniture, vending machines and the like, it has been known to use two hand carts on opposite sides of the item, with the hand carts being strapped together. The weight of the item is no longer supported by the hand cart operator. However, when using two hand carts on a large or bulky item, difficulty may be encountered in maneuvering the item through doorways, down hallways, in congested areas and the like.

Further difficulties may be encountered when using either a single hand cart or two hand carts as a result of the surface on which the item is being moved. In known hand cart designs, the hand cart wheels are relatively small, and moving the hand cart on soft carpeting, uneven floors or across the ground can be difficult. Moving along sidewalks, and even entering elevators can be difficult due to the presence of cracks, separations and voids in the surface, which can ensnare the wheels of the hand cart.

What is needed are a hand cart design and a cart moving system useful for moving large, bulky items, which are highly maneuverable and easy to operate on various types of surfaces, including the ground.

SUMMARY OF THE INVENTION

The present invention provides a cart moving system, and individual carts therefor, which can be lashed together when moving large and bulky items, and which have removable, large diameter wheels to supplement smaller, swivel caster-type wheels on the cart when moving over difficult surfaces.

The invention comprises, in one form thereof, a cart moving system, with a first hand cart having a first upright frame, a first set of wheels at the bottom of the first frame and a first support platform extending forwardly of the first set of wheels. A second hand cart has a second upright frame, a second set of wheels at the bottom of the second frame and a second support platform extending forwardly of the second set of wheels. Lashing means fastens the first hand cart and the second hand cart together. A first pair of large diameter wheel assemblies are removably mounted to the first upright frame; and a second pair of large diameter wheel assemblies are removably mounted to the second upright frame.

The invention comprises, in another form thereof, a hand cart with a frame having first and second ends. A pair of primary wheels are spaced from each other and connected to the frame near one of the ends. A support platform is connected to the frame. A pair of auxiliary wheel assemblies, each including a wheel of larger diameter than the primary wheels, are removably attached to the frame.

The invention comprises, in yet another form thereof, a method for moving an article, with steps of providing a hand cart with a frame, a set of primary wheels on the frame and a support platform on the frame; supporting the article to be moved on the support platform; and attaching to the frame a pair of auxiliary wheels larger in diameter than the primary wheels.

An advantage of the present invention is providing a cart moving system for moving large, heavy and awkward items easily and efficiently.

Another advantage is providing hand carts with removable auxiliary wheels for transporting on difficult surfaces, including uneven surfaces, rough surfaces and the ground.

Yet another advantage is providing a cart moving system with improved maneuverablity.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
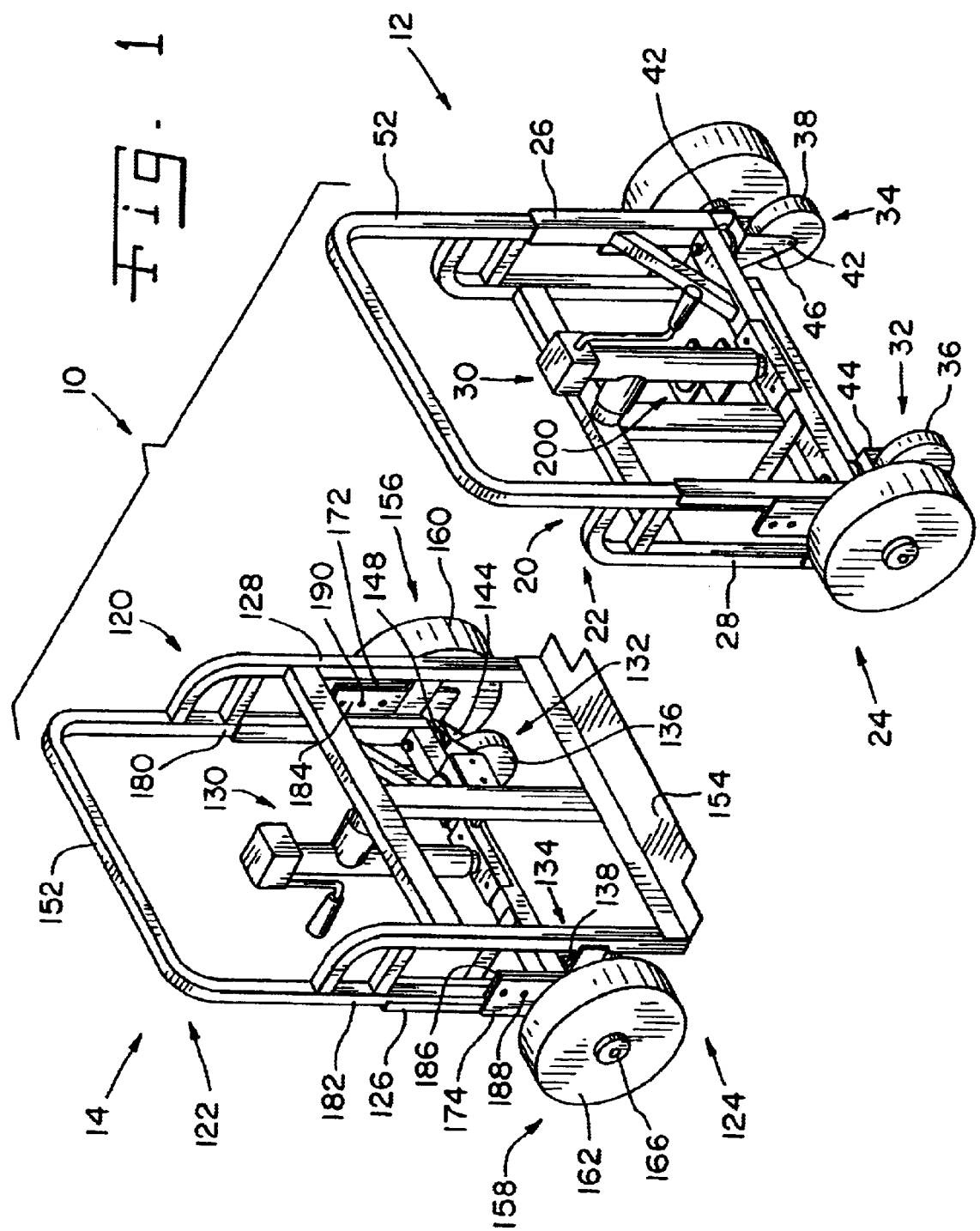
FIG. 1 is a perspective view of a cart moving system in accordance with the present invention.
Figure 4:
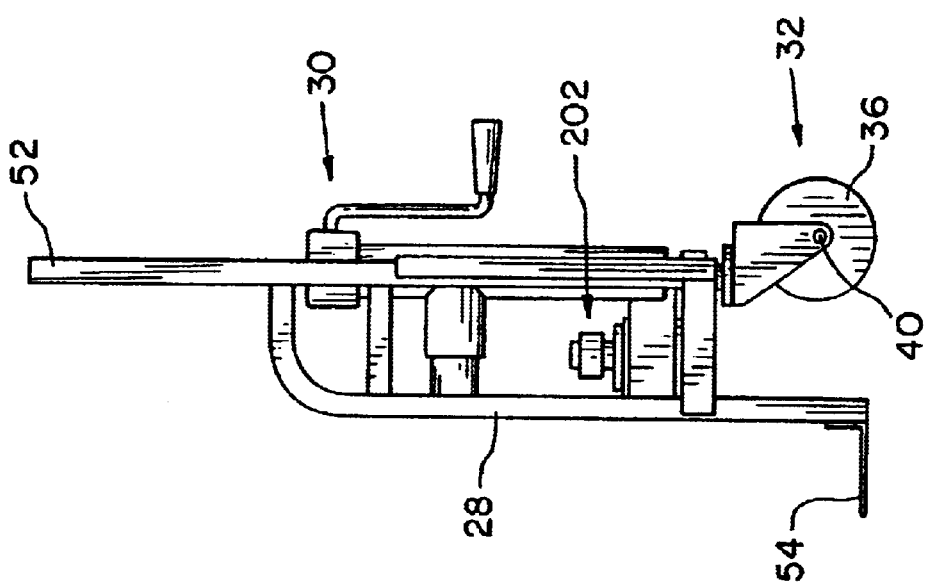
FIG. 4 is a side elevational view of the hand card shown in FIG. 2.
Figure 2:
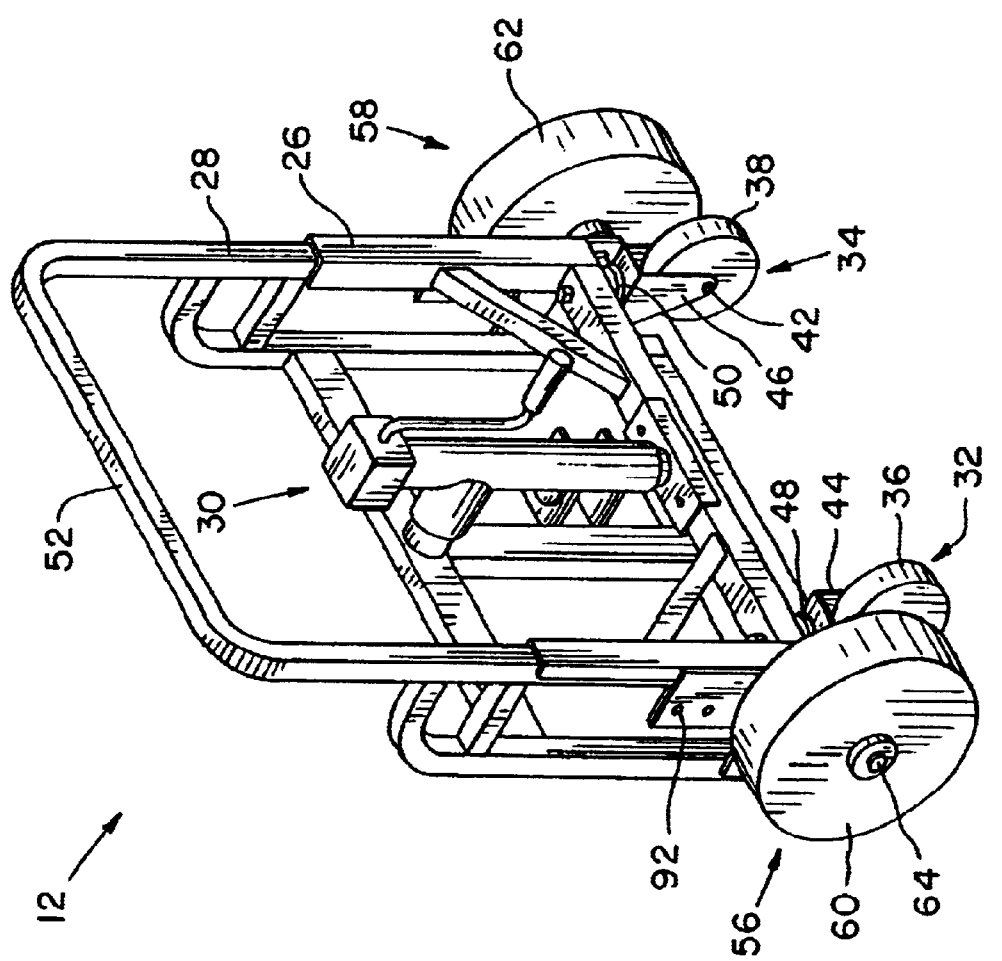
FIG. 2 is a perspective view of one of the hand carts shown in FIG. 1.
Figure 3:
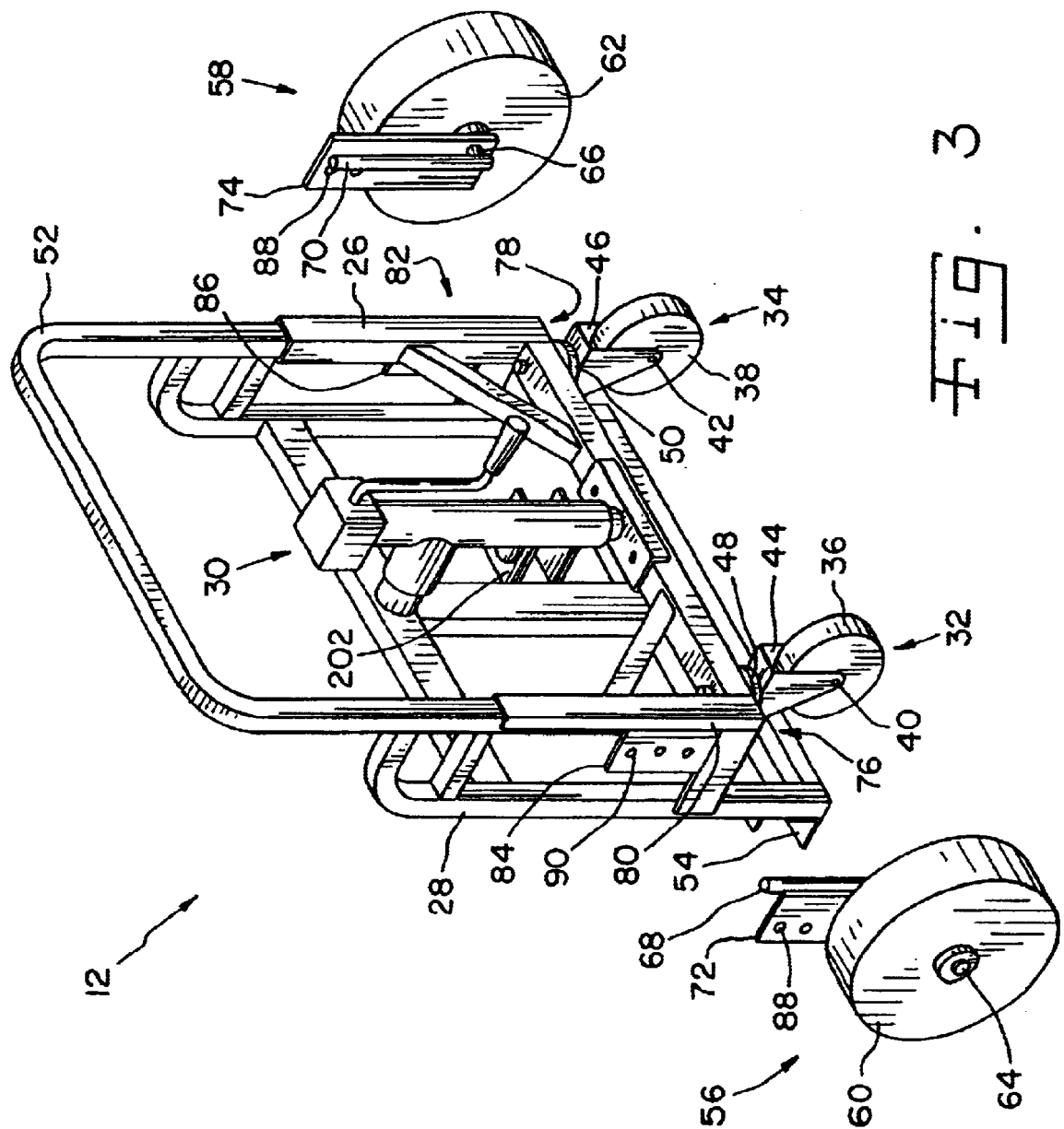
FIG. 3 is a perspective view of the hand cart shown in FIG. 2, but illustrated the auxiliary wheel assemblies removed from the hand cart.

Referring now to the drawings, and more particularly to FIG. 1, there is shown a cart moving system 10 in accordance with the present invention, which generally includes a first hand cart 12 and a second hand cart 14. First and second hand carts 12 and 14 can each be used separately to move small, lighter, less cumbersome items. Advantageously, first and second hand carts 12 and 14 can be used together to move larger, heavier and more cumbersome or awkward items.

Hand cart 12 includes a substantially upright frame 20 having a first or upper end 22 and a second or lower end 24. Generally hand carts 12 and 14 or used in substantially upright positions, and the terms "upper" and "lower" used herein are used in an effort to be descriptive of the typical orientation, and are not meant to imply required vertical orientation, nor are they intended to limit the descriptions and subsequent claims.

Frame 20 includes a base frame 26 and a lifting frame 28 moveable relative to base frame 26. A jack assembly 30 is operatively disposed between base frame 26 and lifting frame 28, to adjust the relative positioning between the base and lifting frames 26 and 28. Jack assembly 30 can be of an suitable mechanical or hydraulic design, to allow lifting frame 28 to be elevated along base frame 26, with hand cart 12 in the substantially upright position shown.

Spaced primary wheel assemblies 32 and 34 are provided at lower end 24, attached to base frame 26, positioned near outer edges of base frame 26. Primary wheel assemblies 32 and 34 are swivel caster-type wheel assemblies, including wheels 36 and 38 rotationally held by axles 40 and 42 in brackets 44 and 46, respectively. Swivel caster bearings 48 and 50 are provided between base frame 26 and brackets 44 and 46, respectively. Swivel caster bearings 48 and 50 allow brackets 44 and 46 to be spun in full circles, allowing wheels 36 and 38 to be directed at any angle relative to frame 20.

Advantageously, upper end 22 of frame 20 forms a handle 52, which may be structured as a part of base frame 26 or lifting frame 28, and may be used to push or pull first hand cart 12. In the embodiment shown, handle 52 is formed at the top of lifting frame 28.

A support platform 54 is carried by lifting frame 28, at a lower portion thereof, and extends forwardly of wheel assemblies 32 and 34. An article to be moved by first hand cart 12 is placed upon and supported by support platform 54. Movement of lifting frame 28 relative to base frame 26 by jack assembly 30 causes a corresponding movement of support platform 54.

To assist in moving first hand cart 12 across uneven or otherwise difficult surfaces, auxiliary wheel assemblies 56 and 58 are provided, which can be removable attached to frame 20. Auxiliary wheel assemblies 56 and 58 include large diameter wheels 60, 62 supported on axles 64 and 66, respectively. Wheels 60 and 62 are substantially larger than wheels 36 and 38, to facilitate rolling across uneven and irregular surfaces. Wheels having a diameter of about ten inches are advantageous for use as wheels 60 and 62. Auxiliary wheel assemblies 56 and 58 further include posts 68 and 70 and mounting plates 72 and 74, respectively.

Frame 20 defines openings 76 and 78 as entrances to hollow portions 80 and 82 of frame 20, for receiving posts 68 and 70. Frame 20 further includes mounting plates 84 and 86, each positioned relative to the installed positions of auxiliary wheel assemblies 56 and 58 such that one or more hole 88 defined in each mounting plate 72 and 74 aligns with one or more hole 90 defined in each mounting plate 84 and 86. Pins 92 are inserted into aligned holes 88 and 90. As will be explained more fully hereinafter, it is advantageous to provide openings 76 and 78, hollow portions 80 and 82, and mounting plates 84 and 86 as components of lifting frame 28, rather than as components of base frame 26.

Hand cart 14 is constructed similarly to hand cart 12, and includes a substantially upright second frame 120 having a first or upper end 122 and a second or lower end 124. Frame 120 includes a second base frame 126 and a second lifting frame 128 moveable relative to base frame 126. A second jack assembly 130 is operatively disposed between base frame 126 and lifting frame 128, to adjust the relative positioning between the base and lifting frames 126 and 128. Jack assembly 130 can be of an suitable mechanical or hydraulic design to allow lifting frame 128 to be elevated along base frame 126, with hand cart 12 in the substantially upright position shown.

Spaced primary wheel assemblies 132 and 134 are provided at lower end 124, attached to base frame 126, positioned near outer edges of base frame 126. Primary wheel assemblies 132 and 134 are also swivel caster-type wheel assemblies, similar in structure to primary wheel assemblies 32 and 34 described previously, and include wheels 136 and 138 rotationally held by axles (not shown) in brackets 144 (one shown) with swivel caster bearings 148 (one shown) disposed between bracket 144 and base frame 126.

Advantageously, upper end 122 of second frame 120 forms a handle 152, which may be structured as a part of base frame 126 or lifting frame 128, and may be used to push or pull second hand cart 14. In the embodiment shown, handle 152 is formed at the top of lifting frame 128.

A support platform 154 is carried by lifting frame 128, at a lower portion thereof, and extends forwardly of wheel assemblies 132 and 134. An article to be moved by second hand cart 14 is placed upon and supported by support platform 154. Movement of lifting frame 128 relative to base frame 126 by jack assembly 130 causes a corresponding movement of support platform 154.

To assist in moving second hand cart 14 across uneven or otherwise difficult surfaces, a second pair of auxiliary wheel assemblies 156 and 158 is provided, which can be removable attached to frame 120. Auxiliary wheel assemblies 156 and 158 are similar in structure to auxiliary wheel assemblies 56 and 58 described previously, and include large diameter wheels 160, 162 supported on axles 166, one such axle 166 being shown in FIG. 1. Wheels 160 and 162 are substantially larger than wheels 136 and 138, such as about ten inches in diameter, to facilitate rolling across uneven and irregular surfaces. Auxiliary wheel assemblies 156 and 158 further include posts (not shown) similar to posts 68 and 70, and mounting plates 172 and 174, respectively.

Frame 120 defines openings (not shown) similar to openings 76 and 78 as entrances to hollow portions 180 and 182 of frame 120. Frame 120 further includes mounting plates 184 and 186 positioned relative to the installed positions of auxiliary wheel assemblies 156 and 158 such that one or more hole 188 defined in each mounting plate 172 and 174 aligns with one or more hole 190 defined in each mounting plate 184 and 186. Pins 192 are inserted into aligned holes 188 and 190. As will be explained more fully hereinafter, it is advantageous to attach auxiliary wheel assemblies 156 and 158 to lifting frame 128, rather than to base frame 126.

A lashing means 200 is provided for interconnecting hand carts 12 and 14 at substantially opposite sides of an article to be moved. Lashing means 200 includes a winch 202 on at least one of first hand cart 12 and second hand cart 14. A strap, web or rope (not shown) is operatively engaged with winch 202 and may be extended around an article, and an opposite hand cart 12 or 14 positioned therewith.

In the use of cart moving system 10, either first hand cart 12 or second hand cart 14 can be used individually to move smaller items. Use of a single hand cart 12 or 14 shall be explained with respect to first hand cart 12; however, it should be understood that the individual use of second hand cart 14 follows similar procedures.

If the item or items to be moved will cross uneven or irregular surfaces, auxiliary wheel assemblies 56 and 58 are installed on frame 20. Posts 68 and 70 are inserted through openings 76 and 78 and into hollow portions 80 and 82. One or more of holes 88 in each mounting plate 72 and 74 is aligned with one or more holes 90 in each mounting plate 84 and 86. A pin 92 is inserted in at least one set of aligned holes 88 and 90 in adjacent plates 72, 84 and 74, 86. The item or items to be moved are placed on support platform 54, or support platform 54 is slid under the item or items, which may be lashed to frame 20 using winch 202 and a elongated web, strap or rope, as those skilled in the art will understand readily. Jack assembly 30 can be operated to elevate support platform 54, and thereby the item or items supported thereon. Using handle 52, hand cart 12 can be pushed or pulled to the desired location.

If transport is to occur across substantially smooth and even surfaces, auxiliary wheel assemblies 56 and 58 can be removed from frame 20, if installed thereon, or can remain off frame 20 if not already installed thereon.

Providing auxiliary wheel assemblies 56 and 58 installed on lifting frame 28 has additional advantages in that the installation or removal of auxiliary wheel assemblies 56 and 58 can occur even when hand cart 12 is carrying a load thereon. By operating jack assembly 30, lifting frame 28 can be elevated sufficiently so that posts 68 and 70 of auxiliary wheel assemblies 56 and 58 can be inserted into, or removed from openings 76 and 78 of hollow portions 80 and 82, respectively, in lifting frame 28. Thus, auxiliary wheel assemblies 56 and 58 can be removed when door frames or other areas of restricted width are passed through, and auxiliary wheel assemblies 56 and 58 can be added when difficult terrain is to be traversed; each without having to remove hand cart 12 from the load it is carrying, When a large, heavy or bulky item is to be moved, first and second hand carts 12 and 14 are positioned at substantially opposite sides of the item. Hand carts 12 and 14 are lashed together with lashing means 200, such as by using winch 202 and a web, cord, rope, strap or the like, s those skilled in the art will understand readily. After hand carts 12 and 14 have been lashed together using lashing means 200, with the item to be moved disposed therebetween and supported upon support platforms 54 and 154, jack assemblies 30 and 130 are operated to lift the item off the floor or other support structure. Again, depending on the type of surface over which hand carts 12 and 14 will be moved, auxiliary wheel assemblies 56, 58, 156 and 158 may or may not be used. If installation or removal of auxiliary wheel assemblies 56, 58, 156 and 158 is required, such installation or removal for each hand cart 12 and 14 is performed as described above for hand cart 12.

Maneuverability of cart moving system 10 is enhanced by the use of swivel caster wheel assemblies 32, 34, 132 and 134. Even when auxiliary wheel assemblies 56, 58, 156 and 158 are installed on hand carts 12 and 14, either or both lifting frames 28 and 128 can be elevated slightly, to remove auxiliary wheel assemblies 56 and 58 and/or auxiliary wheel assemblies 156 and 158 from load bearing positions, thus transferring the load fully to swivel caster wheel assemblies 32 and 34 and/or swivel caster wheel assemblies 132 and 134. Maneuverability can thus be enhanced even without removing auxiliary wheel assemblies 56, 58 and 156, 158 from carts 12 and 14, respectively.

The present invention provides a highly maneuverable and versatile cart moving system, with first and second hand carts lashed together with the item therebetween. Auxiliary wheel assemblies are provided for each hand cart, to facilitate transport across uneven and irregular surfaces by using auxiliary wheels of large diameter. The auxiliary wheel assemblies can be installed or removed from the cart while a load is supported by the carts.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cart moving system, comprising:
   a first hand cart having a first frame, a first set of wheels at the bottom of said first frame and a first support platform extending forwardly of the first set of wheels;
   a second hand cart having a second frame, a second set of wheels at the bottom of said second frame and a second support platform extending forwardly of said second set of wheels;
   a first pair of auxiliary wheel assemblies removably mounted to said first frame, said first pair of auxiliary wheel assemblies each including a wheel of larger diameter than a diameter of the wheels of said first set of wheels;
   a second pair of auxiliary wheel assemblies removably mounted to said second frame, said second pair of auxiliary wheel assemblies each including a wheel of larger diameter than a diameter of the wheels of said second set of wheels;
   said frame including a first base frame and a first lifting frame, said second frame including a second base frame and a second lifting frame, and said first and second pairs of auxiliary wheel assemblies being mounted to said first lifting frame and said second lifting frame, respectively;
   each said first lifting frame and said second lifting frame having hollow portions, and each auxiliary wheel assembly of said first pair of auxiliary wheel assemblies and said second pair of auxiliary wheel assemblies includes a post insertible into said hollow portions; and
   each auxiliary wheel assembly of said first and second pairs of auxiliary wheel assemblies including a plate having holes therein, and said first lifting frame and said second lifting frame each including a plate with holes therein, and pins extending through said plates of said first and second pairs of auxiliary wheel assemblies and said plates on said first lifting frame and said second lifting frame.

2. The cart moving system of claim 1, said first hand cart including a first jack means disposed between said first base frame and said first lifting frame, and said second hand cart including a second jack means disposed between said second base frame and said second lifting frame.

3. The cart moving system of claim 2, at least one of said first hand cart and said second hand cart including lashing means for securing said first and second hand carts together.

4. A cart moving system, comprising:
a first hand cart having a first frame, a first set of wheels at the bottom of said first frame and a first support platform extending forwardly of the first set of wheels;
a second hand cart having a second frame, a second set of wheels at the bottom of said second frame and a second support platform extending forwardly of said second set of wheels;
a first pair of auxiliary wheel assemblies removably mounted to said first frame, said first pair of auxiliary wheel assemblies each including a wheel of larger diameter than a diameter of the wheels of said first set of wheels; and
a second pair of auxiliary wheel assemblies removably mounted to said second frame, said second pair of auxiliary wheel assemblies each including a wheel of larger diameter than a diameter of the wheels of said second set of wheels;
each said frame and said second frame including hollow portions and plates with holes therein; each auxiliary wheel assembly of said first pair of auxiliary wheel assemblies and said second pair of auxiliary wheel assemblies includes a post insertible into said hollow portions and a plate having holes therein; and pins extend through said plates of said first and second pairs of auxiliary wheel assemblies and said plates on said first frame and said second frame.

5. The cart moving system of claim 4 said frame including a first base frame and a first lifting frame, said second frame including a second base frame and a second lifting frame, and said first and second pairs of auxiliary wheel assemblies being mounted to said first lifting frame and said second lifting frame, respectively.

6. The cart moving system of claim 4, said first hand cart including a first base frame and a first lifting frame; said second hand cart including a second base frame and a second lifting frame; said first and second support platforms being carried on said first and second lifting frames, respectively; a first jack means operatively disposed between said first base and lifting frames and a second jack means disposed between said second base and lifting frame, respectively.

7. The cart moving system of claim 4 said first set of wheels and said second set of wheels being swivel caster-type wheels.

8. A hand cart comprising;
a frame having first and second ends, said frame including hollow portions and frame plates with holes therein;
a pair of primary wheel assemblies spaced from each other and connected to said base frame near one of said ends;
a support platform connected to said frame;
a pair of auxiliary wheel assemblies, each including a wheel of larger diameter than a diameter of said primary wheels, a post insertable into one of said hollow portions of said frame, and a mounting elate having a hole therein; and
a mounting means for removably attaching each of said auxiliary wheel assemblies to said frame, each said means including a pin extending through said hole of said mounting plate and one of said holes of said frame plate, with said post disposed in one of said hollow portions of said frame.

9. The hand cart of claim 8, said frame including a base frame and a lifting frame movably mounted on said base frame, said support platform being attached to said lifting frame, and a jack means disposed between said base and lifting frames.

10. The hand cart of claim 9, said lifting frame including hollow portions therein and openings to said hollow portions near said one of said ends, and said auxiliary wheel assemblies each including a post insertable into said hollow portions through said openings.

11. The hand cart of claim 8, said primary wheel assemblies being swivel caster-type wheels.

12. A hand cart comprising;
a frame having first and second ends;
a pair of primary wheel assemblies spaced from each other and connected to said base frame near one of said ends:
a support platform connected to said frame;
a pair of auxiliary wheel assemblies, each including a wheel of larger diameter than a diameter of said primary wheels; and
mounting means for removably attaching said auxiliary wheel assemblies to said frame;
said lifting frame having plates with holes therein, said auxiliary wheel assemblies each having a plate with holes therein; and said hand cart including pins extending through holes of said plates on said lifting frame and holes of said plates on said auxiliary wheel assemblies.

13. The hand cart of claim 12, said frame including hollow portions therein and openings to said hollow portions near said one of said ends, and said auxiliary wheel assemblies each including a post insertable into said hollow portions through said openings.

14. The hand cart of claim 13, said primary wheel assemblies being swivel caster-type wheels.

* * * * *